United States Patent [19]

Raghavan et al.

[11] Patent Number: 5,417,607
[45] Date of Patent: May 23, 1995

[54] ULTRAHIGH-PRESSURE FAN JET NOZZLE

[75] Inventors: Chidambaram Raghavan; Edmund Y. Ting, both of Kent; Olivier L. Tremoulet, Jr., Edmonds; Anton H. Buchberger, Maple Valley, all of Wash.

[73] Assignee: Flow International Corporation, Kent, Wash.

[21] Appl. No.: 198,645

[22] Filed: Feb. 18, 1994

Related U.S. Application Data

[63] Continuation of Ser. No. 986,677, Dec. 8, 1992, abandoned.

[51] Int. Cl.$^6$ ............................................. B05B 1/02
[52] U.S. Cl. ...................................... 451/56; 451/54; 451/72; 239/597; 29/890.142
[58] Field of Search ................ 29/890.192; 83/174; 51/246–248; 239/597, 589, 590; 451/54, 56, 72

[56] References Cited

U.S. PATENT DOCUMENTS

| | | | |
|---|---|---|---|
| 2,618,989 | 11/1952 | Cepler | 29/890.142 X |
| 3,168,848 | 2/1965 | Bardenhagen et al. | 51/247 X |
| 3,540,166 | 11/1970 | Crumley | 51/247 |
| 3,709,436 | 1/1973 | Foster | 239/287 |
| 3,726,481 | 4/1973 | Foster et al. | 239/287 |
| 3,756,106 | 9/1973 | Chadwick et al. | 83/177 |
| 3,897,002 | 7/1975 | Witty | 239/288 |
| 3,960,407 | 6/1976 | Noren | 299/17 |
| 3,997,111 | 12/1976 | Thomas et al. | 239/1 |
| 4,097,000 | 6/1978 | Derr | 239/599 |
| 4,111,490 | 8/1978 | Liesveld | 299/17 |
| 4,150,794 | 4/1979 | Higgins | 239/596 |
| 4,216,906 | 8/1980 | Olsen et al. | 239/11 |
| 4,508,577 | 4/1985 | Conn et al. | 134/1 |
| 4,537,639 | 8/1985 | Shook | 134/10 |
| 4,845,903 | 7/1989 | Woodward | 239/418 X |
| 5,116,425 | 5/1992 | Ruef | 134/17 |
| 5,167,721 | 12/1992 | McComas et al. | 134/32 |

FOREIGN PATENT DOCUMENTS

| | | | |
|---|---|---|---|
| 989083 | 9/1951 | France | 239/597 |
| 2736314 | 2/1979 | Germany | B05B 1/02 |

OTHER PUBLICATIONS

Jet Edge Jet Nozzle.
Prototype of Jet Nozzle sold on Oct. 1, 1991.

*Primary Examiner*—Andres Kashnikow
*Assistant Examiner*—Kevin P. Weldon
*Attorney, Agent, or Firm*—Seed and Berry

[57] ABSTRACT

A nozzle for producing an ultrahigh-pressure fluid fan jet is shown and described. In a preferred embodiment, the nozzle has an inner surface defined by a conical bore extending from a first end to a second end, thereby creating an entrance orifice and an exit orifice in the first and second ends, respectively. A wedge-shaped notch extends inward from the second end towards the first end to a sufficient depth such that the shape of the exit orifice is defined by the intersection of the conical bore and the wedge-shaped notch. As pressurized fluid passes through the nozzle and out the exit orifice, the shape of the exit orifice causes the pressurized fluid to exit in the form of a fan jet having a substantially oval cross-section. This fan jet may be swept across a surface to be cleaned thereby selectively removing a layer of material from an underlying surface evenly and completely, without damaging the underlying surface. The fan jet may also be used to cut a fibrous or hard material.

4 Claims, 4 Drawing Sheets

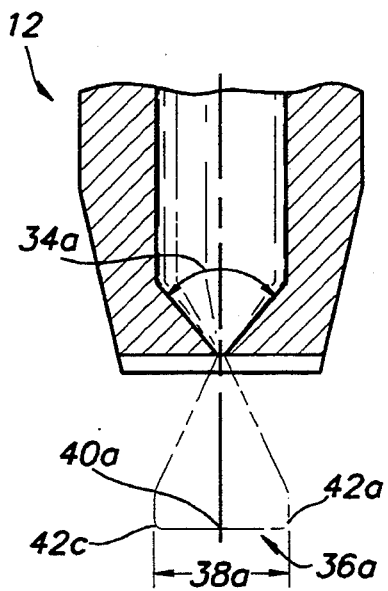
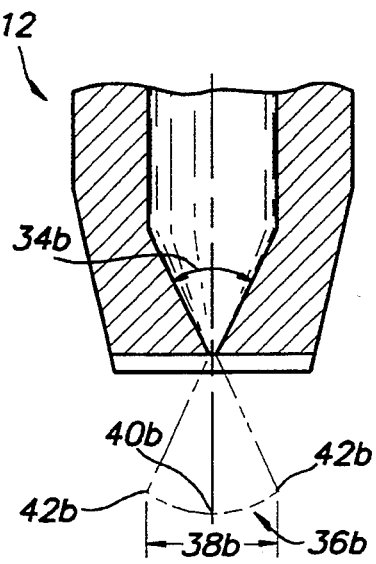
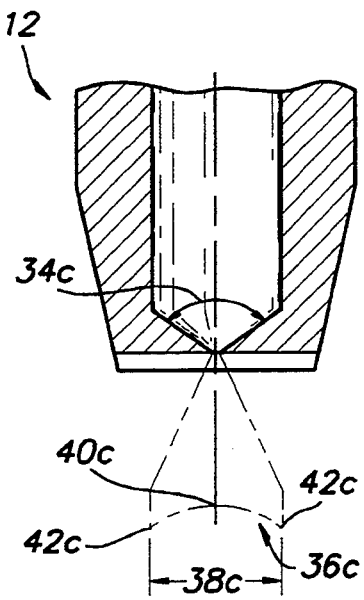
Figure 4a  Figure 4b  Figure 4c
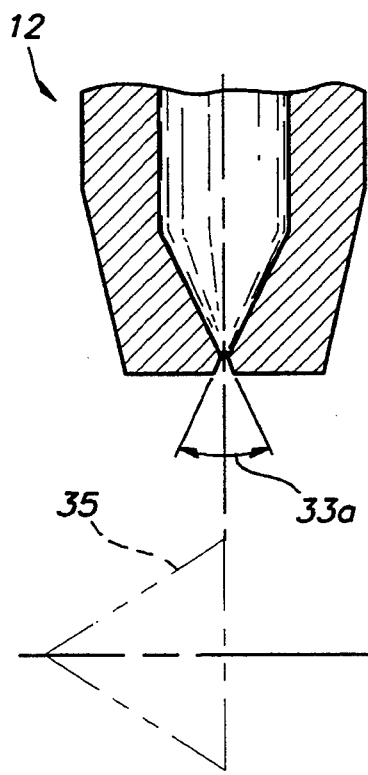
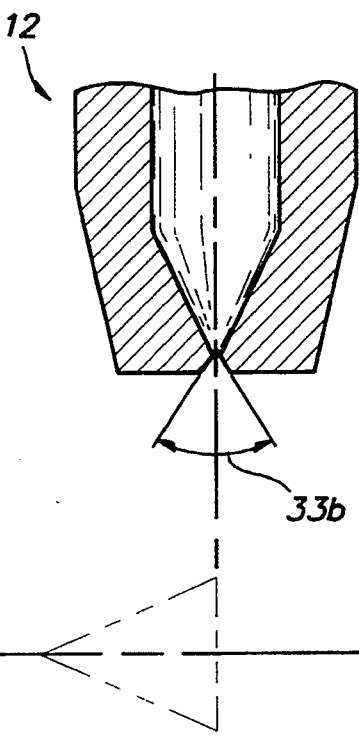
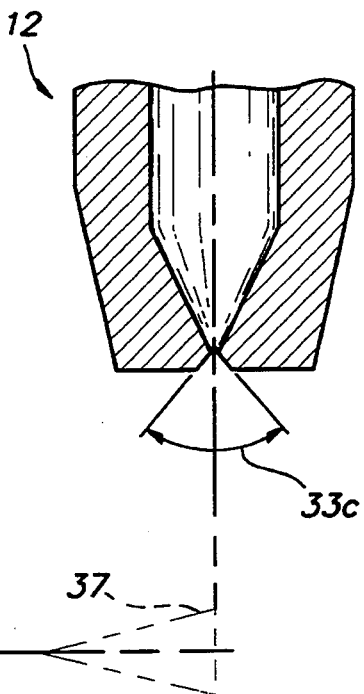
Figure 5a  Figure 5b  Figure 5c

ULTRAHIGH-PRESSURE FAN JET NOZZLE

CROSS-REFERENCE TO RELATED APPLICATION

This application is a continuation of United States patent application Ser. No. 07/986,677, filed Dec. 8, 1992, now abandoned.

TECHNICAL FIELD

This invention relates to nozzles, and more particularly, to nozzles for use in connection with ultrahigh-pressure fluid jets.

BACKGROUND OF THE INVENTION

Numerous tasks, for example cutting, cleaning, milling, and kerfing, may be accomplished through the use of a stream of pressurized fluid, typically water, generated by high-pressure, positive displacement pumps or other suitable means. Such pumps pressurize a fluid by having a reciprocating plunger that draws the fluid from an inlet area into a pressurization chamber during an intake stroke, and acts against the fluid during a pumping stroke, thereby forcing pressurized fluid to pass from the pressurization chamber into an outlet chamber, from which it is collected into a manifold. The pressurized fluid is then directed through the nozzle of a tool thereby creating an ultrahigh-pressure jet that may be used to perform a particular task, for example cutting a sheet of metal or cleaning a surface, such as on aircraft parts. Such jets may reach pressures up to and beyond 55,000 psi.

In the past, such ultrahigh-pressure fluid tasks have been accomplished using nozzles that produce a column of pressurized fluid having a circular cross-section. Rotating such a round jet is equivalent to moving a point. As a result, a round jet may be well-suited for direct use in certain tasks, for example, cutting out odd shapes such as a diaper. For other tasks, such as cleaning, round jets require relatively complex methods of use and may not provide optimum results.

For example, when cleaning a surface, it is desirable and often necessary to remove a layer of matter from an underlying surface without damaging the underlying surface. It is also often necessary to have a 100% clean surface. To clean a surface with a round jet, it is necessary to move the round jet, or point, in a circular pattern in an attempt to clean the entire surface. However, such a method produces a pattern in which some areas on the surface being cleaned are hit multiple times while other areas of various shapes are not hit at all by the jet. As a result, the surface is not 100% clean, and the underlying surface will be damaged and uneven.

A need therefore exists for an improved method of cleaning surfaces and accomplishing other ultrahigh-pressure fluid tasks.

SUMMARY OF THE INVENTION

It is therefore an object of this invention to provide an improved method of cleaning surfaces.

It is another object of this invention to provide a nozzle that will produce an ultrahigh-pressure fluid jet that will uniformly remove a layer of matter from an underlying surface without damaging the underlying surface.

It is another object of this invention to provide a nozzle that is simple to manufacture that will produce consistent results.

These and other objects of the invention, as will be apparent herein, are accomplished by providing an ultrahigh-pressure fan jet nozzle. In a preferred embodiment, the nozzle has an inner surface defined by a conical bore that extends from a first end of the nozzle to a second end of the nozzle. As a result, the first end is provided with an entrance orifice through which a volume of pressurized fluid may enter the nozzle and the second end is provided with an exit orifice through which the pressurized fluid may exit after passing through the body of the nozzle. The second end of the nozzle is further provided with a wedge-shaped notch that extends from its widest point at the second end in towards the first end of the nozzle, intersecting the exit orifice. As a result, the shape of the exit orifice is defined by the intersection of the conical bore and the wedge-shaped notch. The shape of the exit orifice causes the pressurized fluid leaving the nozzle to do so as a fan jet, having a substantially linear footprint, the width of which varies with changes in the geometry of the nozzle. For purposes of discussion, the footprint may be viewed as a thin rectangle, or as an oval having a very high aspect ratio, such as 100 to 1, having a major axis and a minor axis. This fan jet may be swept across a surface to be cleaned in the direction of the minor axis of the footprint to selectively remove a layer of material. Alternatively, the fan jet may be swept across a surface to be cut in the direction of the major axis of the footprint, thereby producing a shearing, cutting force. Such a fan jet may be particularly well suited to cutting fibrous materials, although it would also provide an accurate, straight cut in a hard material.

The power distribution of the fan jet may be controlled by changing an internal angle of the conical bore and an angle of the wedge-shaped notch. This is beneficial because different power distributions may be more appropriate than others for a particular task. For example, in the context of cleaning as discussed above, it is believed to be desirable to have a fan jet with a uniform power distribution, which may be accomplished by correctly adjusting the geometry of the nozzle.

In a preferred embodiment, an outer surface of the nozzle is also conical such that the second end has a substantially circular, planar surface. In addition, the wedge-shaped notch is aligned with a diameter of the circular planar surface such that the resulting fan jet will be vertically aligned with a longitudinal axis of the nozzle. In an alternative embodiment, the wedge-shaped notch may be offset such that it is not aligned with a diameter of the surface of the second end, thereby producing a "side-firing" fan jet that exits the nozzle at an angle relative to the longitudinal axis of the nozzle. Such a side-firing jet may also be produced by grinding the wedge-shaped notch at an angle relative to the longitudinal axis of the nozzle, such that the axis of the nozzle is not in the plane of the notch.

In a yet another alternative embodiment, the wedge-shaped notch may be at an angle relative to the longitudinal axis of the nozzle such that the axis of the nozzle is in the plane of the notch. This produces an "angled" fan jet.

In a preferred embodiment illustrated herein, the nozzle is mounted in a receiving cone such that when a volume of pressurized fluid passes through the nozzle, the receiving cone acts against the nozzle causing the inner walls of the nozzle near and at the exit orifice to be in a compressive state of stress. This condition increases the nozzle's resistance to fatigue and wear.

In a preferred embodiment, the nozzle is manufactured by machining out a conical bore from a blank of annealed stainless steel. The internal surface of the nozzle is finished by pressing a cone-shaped die into the conical bore, thereby eliminating machining marks and improving the inner surface quality. The part is then heat treated, before or after which the outer surface of the nozzle may be finished. Once the part is heat treated, a wedge-shaped notch is machined out of the second end of the nozzle to a sufficient depth such that a shape of the exit orifice is defined by the intersection of the conical bore and the wedge-shaped notch.

BRIEF DESCRIPTION OF THE DRAWINGS

FIGS. 4a-c are diagrams illustrating the effect of changing an internal cone angle of the nozzle of FIG. 2 on the power distribution of a resulting fan jet.

FIGS. 5a-c are diagrams illustrating the effect of changing an external wedge angle of the nozzle of FIG. 2 on the shape of the resulting fan jet.

DETAILED DESCRIPTION OF THE INVENTION

Various tasks such as cutting, cleaning, milling, and kerfing may be accomplished through the use of an ultrahigh-pressure fluid jet. Such jets may be generated by high-pressure, positive displacement pumps (not shown) and may reach pressures up to and beyond 55,000 psi. The pressurized fluid generated by the pump is typically collected in a manifold from which the fluid is directed through the nozzle of a tool (not shown), thereby creating an ultra-high pressure jet that may be used to perform a particular task.

Figure 1:
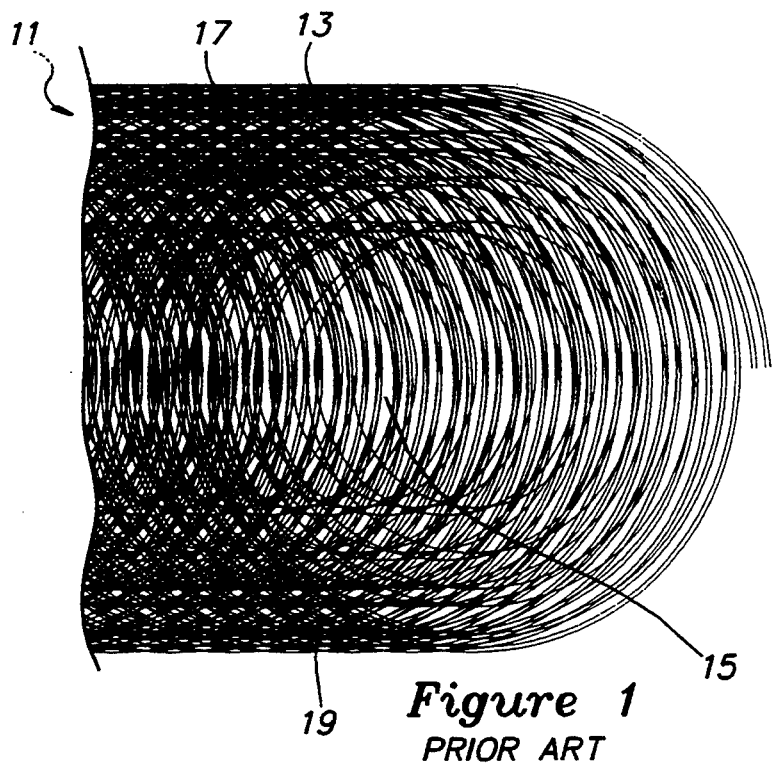
FIG. 1 is an example of a pattern made by a prior art circular jet when rotated and traversed across a surface.

In the current state of the art, a column of pressurized fluid having a circular cross section is typically used. Although circular jets are beneficial in certain applications, for example cutting complex shapes, a moving circular jet represents a moving point and therefore has severe limitations in other contexts such as cleaning. The current practice in cleaning a surface with a circular jet is to rotate and translate circular jets along a surface, resulting in the pattern 11 shown in FIG. 1. As illustrated in FIG. 1, there are various shaped areas such as diamonds 13, crescents 15, and triangles 17, among others, that are never hit by the rotating and translating jets (not shown). In addition, as illustrated in FIG. 1 at 19, there are several areas on the surface that are hit by the jets multiple times. As a result, the surface is not cleaned completely or evenly, resulting in a damaged surface.

Figure 2:
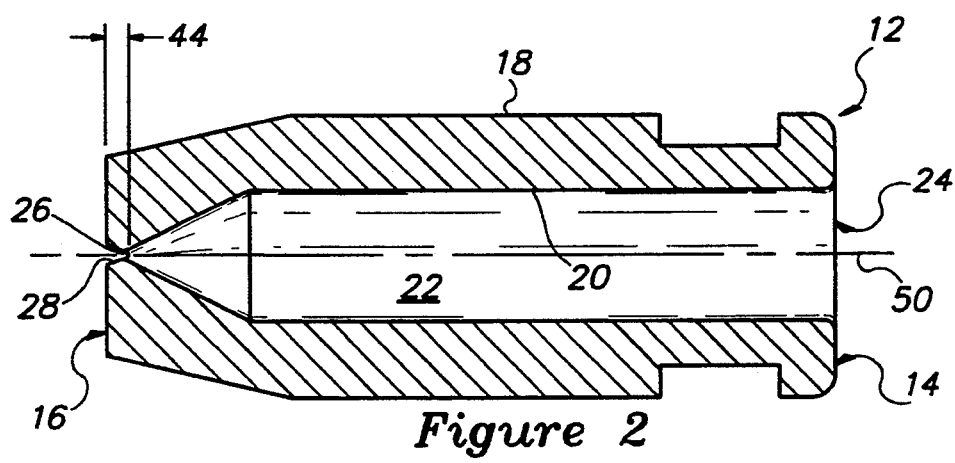
FIG. 2 is a cross-sectional view of a nozzle illustrating a preferred embodiment of the present invention.
Figure 3:
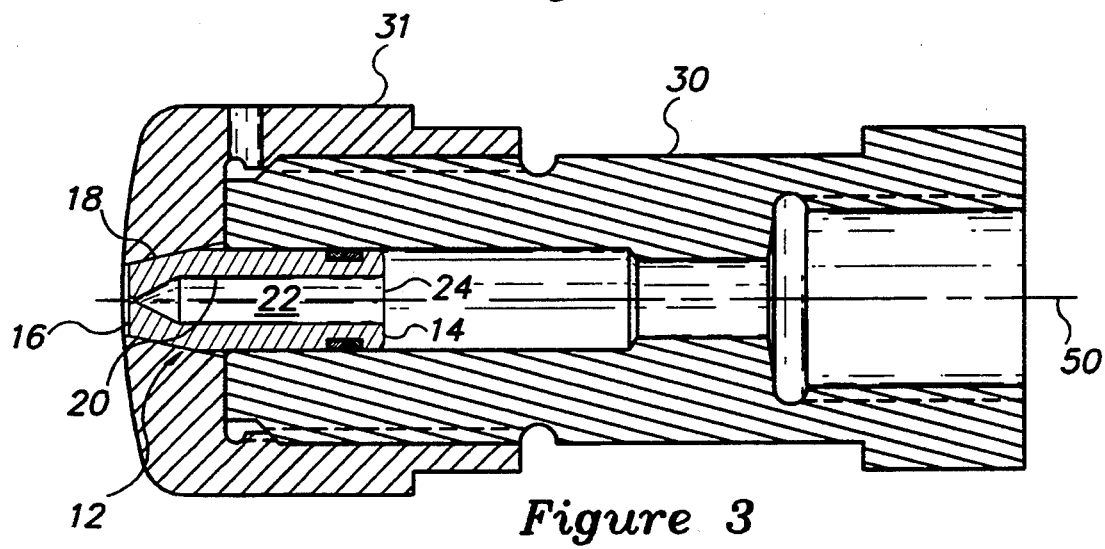
FIG. 3 is a cross-sectional view of the nozzle of FIG. 2 mounted in a receiving cone.

FIGS. 2 and 3 illustrate a preferred embodiment of the present invention. A nozzle 12 has a first end 14, a second end 16, an outer surface 18 and an inner surface 20. The inner surface 20 is defined by a conical bore 22, that extends from the first end 14 to the second end 16, thereby creating an entrance orifice 24 and an exit orifice 26 in the first end 14 and second end 16, respectively. A wedge-shaped notch 28 extends from the second end 16 in towards the first end 14 to a depth 44 such that the notch 28 and conical bore 22 intersect. The shape of the exit orifice 26 is therefore defined by this intersection of the conical bore 22 and the wedge-shaped notch 28. As a volume of pressurized fluid passes through the nozzle 12 and out the exit orifice 26, the shape of the exit orifice 26 causes the pressurized fluid to exit the nozzle as a fan jet, having a substantially linear footprint.

As illustrated in FIG. 3, the nozzle 12 in a preferred embodiment is mounted within a receiving cone 30, including a nozzle nut 31. As pressurized fluid passes through the receiving cone 30 and the nozzle 12, the receiving cone 30 acts against the nozzle 12 thereby placing the inner surface 20 of the nozzle 12 near and at the exit orifice 26 in a compressive state of stress. By being in compression rather than tension, the nozzle 12 is more resistant to fatigue and wear.

Figure 6A:
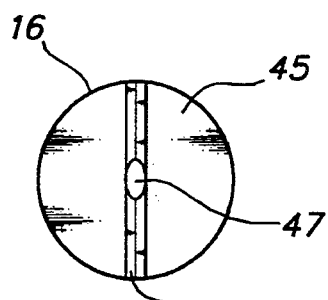
FIGS. 6a-b are bottom plan views illustrating alternative embodiments of the nozzle of FIG. 2.
Figure 7A:
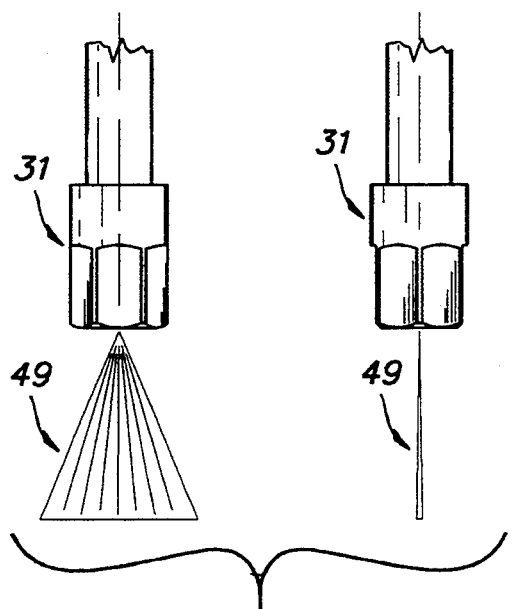
FIGS. 7a-c are diagrams illustrating front and side views of three alternative embodiments of the nozzle of FIG. 2 and resulting fan jets.

In a preferred embodiment, the outer surface 18 of the nozzle 12 is conical such that the second end 16 has a substantially circular, planar surface 45, as illustrated in FIG. 6a. The wedge-shaped notch 28 is aligned along a diameter of the circular surface 45, such that it passes through a center 47 of the second end 16. As a result, the fan jet of pressurized fluid will exit the nozzle 12 in a direction substantially aligned with a longitudinal axis 50 of the nozzle 12. This fan jet may be referred to as a "straight" fan 49, as illustrated in FIG. 7a. A straight fan 49 may be useful in various contexts, for example, in cleaning or coating removal, as will be discussed in greater detail below.

Figure 6B:
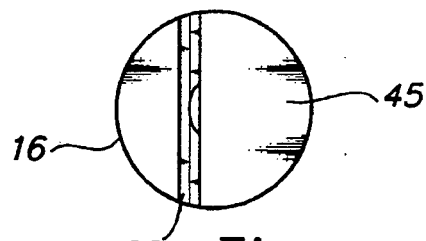
Figure 7B:
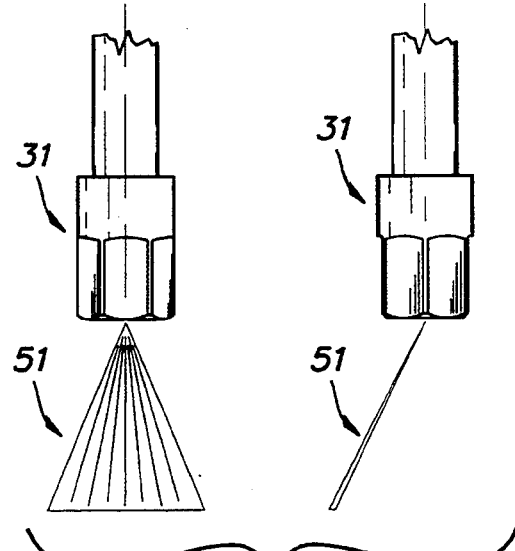

In an alternative embodiment, as illustrated in FIG. 6b, the wedge-shaped notch 28 is offset such that it is not aligned along a diameter of the circular surface 45 of the second end 16. As a result, the fan jet will exit the nozzle 12 at an angle relative to the longitudinal axis 50 of the nozzle 12. Such a fan jet may be referred to as a "side-firing" fan 51, as illustrated in FIG. 7b. A side-firing fan jet 51 may also be produced by grinding the wedge-shaped notch 28 at an angle relative to the longitudinal axis 50 of nozzle 12, such that the axis 50 of nozzle 12 is not in the plane of the notch 28. Side-firing fan jets 51 may be useful in various contexts, for example, when it is necessary to clean or remove grout from sides of a narrow, deep area, such as a gap between two concrete blocks.

Figure 7C:
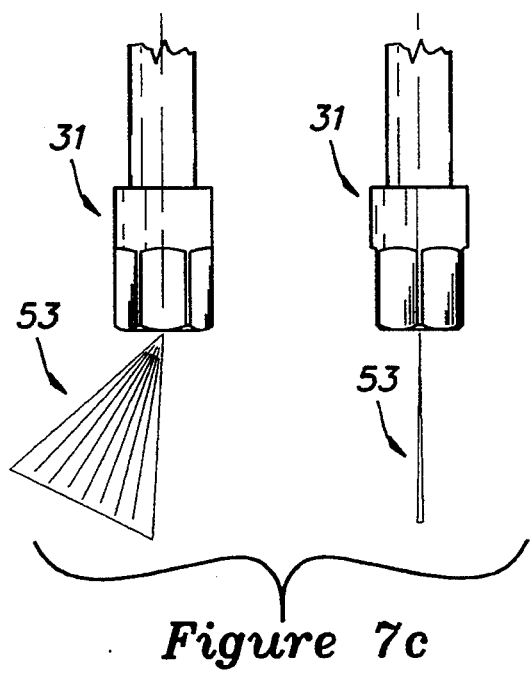

In yet another alternative embodiment, as illustrated in FIG. 7c, the wedge-shaped notch 28 may be at an angle relative to the longitudinal axis 50 of the nozzle 12 such that the axis 50 of the nozzle 12 is in the plane of the notch 28. This produces an "angled" fan jet 53, which is believed to be useful in various contexts.

As discussed above, the pressurized fluid exiting the nozzle 12 is in the form of a fan jet having a substantially linear footprint, the width of which varies with changes in the geometry of the nozzle. For purposes of discussion, the footprint may be viewed as a thin rectangle, or as an oval having a very high aspect ratio, such as 100 to 1, having a major axis and a minor axis. The geometry of the fan jet may be controlled by adjusting the geometry of the nozzle, different geometries being more desirable depending on the task at hand. For example, in cleaning it is often desirable to selectively remove a layer of matter from an underlying surface, without damaging the underlying surface. It is also desirable and often necessary to have a 100% clean surface. By sweeping the fan jet produced by the preferred embodiment of the nozzle 12 illustrated herein across a surface to be cleaned in the direction of the minor axis of the fan jet's footprint, it is possible to remove a layer of material evenly and completely, thereby avoiding the problems associated with the rotation and translation of a circular jet. It will be appreciated by one of ordinary skill in the art, that a number of nozzles 12 may be aligned and translated across a surface in unison to clean a larger area more quickly and efficiently. Alternatively, the fan jet may be swept across a surface to be cut in the direction of the major axis of the footprint, thereby providing a shearing, cutting force. Such a fan jet may be particularly well suited to cutting fibrous materials, although it would also provide an accurate, straight cut in a hard material.

As illustrated in FIGS. 4a–c, the geometry of the nozzle 12 may be altered to control the resulting geometry and power distribution of the fan jet. For example, as discussed in the cleaning illustration above, it is desirable to have a uniform power distribution along a width of the fan jet thereby resulting in an even distribution of power across the surface being cleaned. In a preferred embodiment, as illustrated in FIG. 4a, an internal angle 34a of the conical bore 22 is 90° to achieve a uniform power distribution 36a of the fan jet, such that the power at the center 40a at the ends 42a of the fan jet is the same. In an alternative embodiment, as illustrated in FIG. 4b, the internal angle 34b of the conical bore 22 is less than 90°, for example, 60°, thereby resulting in a power distribution 36b that is concentrated at a center 40b of the fan jet and tapers at the ends 42b of the fan jet. In another alternative embodiment, as illustrated in FIG. 4c, an internal angle 34c of the conical bore 22 is greater than 90°, for example, 105°, resulting in a power distribution 36c that is concentrated on the ends 42c of the fan jet and minimal at the center 40c of the fan jet. Each of these configurations has its own uses. For example, the even power distribution illustrated in FIG. 4a is preferred for many cleaning tasks because it acts uniformly along its width against the surface to be cleaned.

As illustrated in FIGS. 5a–c, changes to an external angle 33 of the wedge-shaped notch 28 may be made to control the shape and thickness of the fan jet. As illustrated in FIG. 5a, a small wedge angle 33a produces a wide-angled fan 35, while a large wedge angle 33c, as shown in FIG. 5c, produces a narrow-angled fan 37. Although not shown, the thickness of the fan jet also increases with an increase in the wedge angle. Again, different configurations have different applications, for example, a narrow-angled fan such as that produced by the wide-angled wedge angle in FIG. 5c will be more focused in delivering power to a target, which may be necessary if the distance between the nozzle 12 and the surface being cleaned is great.

The nozzle 12 is manufactured by machining a blank 64 from any high-strength, metallic alloy, for example, annealed steel. In a preferred embodiment, the nozzle 12 is made from Carpenter Custom 455 stainless steel. The conical bore 22 is machined out of the blank, after which the inner surface 20 is finished by pressing a cone-shaped die (not shown) into the conical bore 22, thereby eliminating machining marks and improving the quality of the inner surface 20. The nozzle 12 is then heat treated at a given temperature for a given amount of time, to increase the strength of the material. The correct temperature and time are dependent on the material used, and will be known by one of ordinary skill in the art. For example, in a preferred embodiment, where the nozzle is made from Carpenter Custom 455, the nozzle is treated at 900° F. for four hours, and then air cooled. The outer surface 18 of the nozzle 12 may be finished before or after the nozzle is heat treated. In a preferred embodiment, the outer surface 18 is conical, such that the second end 16 has a substantially circular, planar surface 45.

Figure 8:
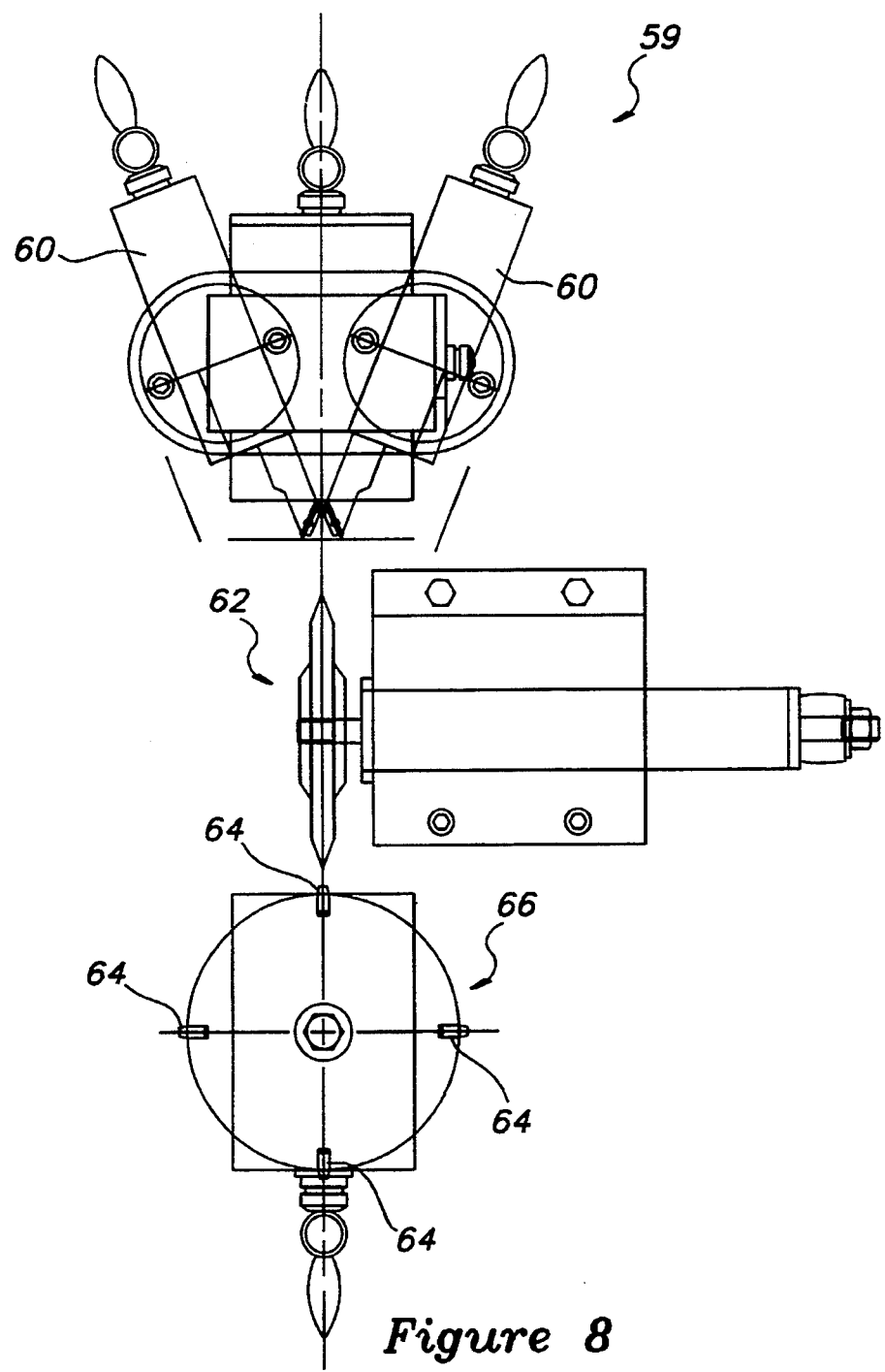
FIG. 8 is a top plan view of a grinding fixture used to manufacture the nozzle of FIG. 2.

The wedge-shaped notch 28 is then machined into the second end 16 of the blank 64, or nozzle 12, to a sufficient depth such that the notch 28 intersects the exit orifice 26 created by the conical bore 22. As illustrated in FIG. 8, the grinding fixture 59 includes two diamond dressers 60 which may be positioned to create a desired angle such that when the dressers 60 act against a grinding wheel 62, they will produce the same angle on the edge of the grinding wheel 62. Several of the blanks 64 are mounted on a turret 66, which may move both laterally and longitudinally to align the blank 64 with the grinding wheel 62. As the grinding wheel 62 acts against the blank 64 to create the wedge-shaped notch 28, the angle of which corresponds to the desired angle of the dressers and grinding wheel, lubricants are used to cool the machinery and prevent damage, the method and necessity of which will be understood by one of ordinary skill in the art.

A first blank 64 is used to calibrate the system. An operator of the grinding fixture 59 grinds a wedge-shaped notch 28 into the blank 64, and then rotates the turret 66 90° to inspect the alignment of the wedge-shaped notch 28 with the conical bore 22. This inspection is done through a microscope (not shown). If the wedge-shaped notch 28 is not properly aligned, adjustments are made by moving the turret 66. Once the desired alignment is achieved, multiple nozzles 12 may then be completed very quickly by mounting multiple blanks 64 on the turret 66 and grinding the wedge-shaped notch 28 via the grinding wheel 62. In addition, different depths of the wedge-shaped notch 28 will be desired, depending on the intended task and the size of the nozzle, as measured by a diameter of the nozzle 12. The desired depth is calibrated and checked by measuring the length of a minor axis of the exit orifice 26 which will have an oval shape due to the intersection of the wedge-shaped notch 28 and the conical bore 22.

A nozzle for generating an ultrahigh-pressure fluid fan jet has been shown and described. From the foregoing, it will be appreciated that, although embodiments of the invention have been described herein for purposes of illustration, various modifications may be made without deviating from the spirit and scope of the invention. Thus, the present invention is not limited to the embodiments described herein, but rather is defined by the claims which follow.

We claim:

1. A method for making an ultrahigh-pressure fan jet nozzle comprising:
   machining a blank from a high-strength, metallic alloy, the blank having a first end and a second end;
   machining a wedge-shaped notch into the second end;
   machining out a bore in the blank that extends from the first end to the second end, the bore having a cylindrical section at the first end that transitions into a converging conical section adjacent the second end, a largest diameter of the conical section being equivalent to a diameter of the cylindrical section, thereby creating an entrance orifice in the first end and an exit orifice in the second end such that a shape of the exit orifice is defined by the intersection of the conical section of the bore and the wedge-shaped notch;

pressing a cone-shaped die into the conical bore thereby eliminating machining marks and improving an inner surface of the nozzle; and heating the nozzle to increase the strength of the nozzle.

2. The method according to claim 1 wherein the nozzle is made of Carpenter Custom 455 and is heat treated at 900° F. for four hours and then air cooled.

3. The method according to claim 1 wherein the machining of the wedge-shaped notch is achieved by positioning two dressers to create a desired angle;

dressing the grinding wheel with the dressers such that an edge of the grinding wheel is at the desired angle;

aligning the blank with the edge of the grinding wheel; and grinding the wedge-shaped notch into the blank via the grinding wheel such that an angle of the wedge-shaped notch corresponds to the desired angle.

4. The method according to claim 1, further comprising:

selecting an internal angle of the conical bore; and selecting an angle and a depth of the wedge-shaped notch such that the fan jet nozzle is appropriately configured to perform a given task.

* * * * *